(12) United States Patent
Chang et al.

(10) Patent No.: US 11,494,336 B2
(45) Date of Patent: Nov. 8, 2022

(54) APPROACHES FOR MANAGING OBJECT DATA

(71) Applicant: Palantir Technologies Inc., Denver, CO (US)

(72) Inventors: Allen Chang, Mountain View, CA (US); Denis Rochau, London (GB); Eric Raboin, Portland, OR (US); Joel Ossher, Oakton, VA (US); Sam Stoll, London (GB)

(73) Assignee: Palantir Technologies Inc., Denver, CO (US)

( * ) Notice: Subject to any disclaimer, the term of this patent is extended or adjusted under 35 U.S.C. 154(b) by 25 days.

(21) Appl. No.: 17/067,492

(22) Filed: Oct. 9, 2020

(65) Prior Publication Data
US 2021/0109893 A1    Apr. 15, 2021

Related U.S. Application Data

(60) Provisional application No. 62/914,383, filed on Oct. 11, 2019.

(51) Int. Cl.
*G06F 16/14* (2019.01)
*G06F 16/174* (2019.01)

(52) U.S. Cl.
CPC .......... *G06F 16/152* (2019.01); *G06F 16/174* (2019.01)

(58) Field of Classification Search
CPC .... G06F 16/152; G06F 16/174; G06F 16/215; G06F 16/1748; G06F 16/285; G06F 3/0641; G06F 16/244
See application file for complete search history.

(56) References Cited

U.S. PATENT DOCUMENTS

| | | | |
|---|---|---|---|
| 7,840,537 B2* | 11/2010 | Gokhale | G06F 3/0638 707/698 |
| 9,348,880 B1 | 5/2016 | Kramer et al. | |
| 2010/0332401 A1* | 12/2010 | Prahlad | H04L 63/0428 711/E12.001 |
| 2011/0307447 A1* | 12/2011 | Sabaa | G06F 16/27 707/693 |
| 2012/0179656 A1 | 7/2012 | Bunte et al. | |
| 2001/8030770 | 10/2018 | Luthra et al. | |
| 2019/0303462 A1 | 10/2019 | Brown et al. | |

OTHER PUBLICATIONS

Extended European Search Report for EP Application No. 20200915.5 dated Mar. 12, 2021, 6 pages.

* cited by examiner

*Primary Examiner* — Angelica Ruiz
(74) *Attorney, Agent, or Firm* — Sheppard Mullin Richter & Hampton LLP (57) ABSTRACT

Systems and methods are provided for determining multiple fragments of data to be imported, the multiple fragments of data corresponding to different instances of data obtained from one or more external data sources, the different instances of data each corresponding to duplicate content. The multiple fragments of data that each correspond to different instances of duplicate content can be ingested. The multiple fragments of data can be de-duplicated to determine one or more corresponding object data source records (DSRs). The one or more object DSRs can be imported within a data platform system.

20 Claims, 8 Drawing Sheets

APPROACHES FOR MANAGING OBJECT DATA

CROSS-REFERENCE TO RELATED APPLICATION

This application claims the benefit under 35 U.S.C. 119(e) of U.S. Provisional Application No. 62/914,383, filed Oct. 11, 2019, the content of which is hereby incorporated in its entirety.

FIELD OF THE INVENTION

This disclosure relates to technologies for managing object data in a data platform system.

BACKGROUND

A data integration pipeline can be used to ingest data stored in disparate data sources and represent the ingested data based on some format. For example, the data may be ingested from various data sources, such as databases, comma-separated text files, and spreadsheets, to name some examples. The ingested data can be represented based on a data ontology and be made accessible to users of a data platform system.

SUMMARY

Various embodiments of the present disclosure can include systems, methods, and non-transitory computer readable media configured to determine multiple fragments of data to be imported, the multiple fragments of data corresponding to different instances of data obtained from one or more external data sources, the different instances of data each corresponding to duplicate content. The multiple fragments of data that each correspond to different instances of duplicate content can be ingested. The multiple fragments of data can be de-duplicated to determine one or more corresponding object data source records (DSRs). The one or more object DSRs can be imported within a data platform system.

In an embodiment, each ingested fragment is associated with a corresponding hash value, and wherein the hash value is determined based on content associated with the ingested fragment.

In an embodiment, de-duplicating the multiple fragments of data further includes de-duplicating the multiple fragments of data based on their respective hash values.

In an embodiment, fragments having a same first hash value are associated with a first object DSR, and wherein fragments having a same second hash value are associated with a second object DSR.

In an embodiment, de-duplicating the multiple fragments of data further includes de-duplicating the multiple fragments of data based on their respective hash values and other information associated with the fragments.

In an embodiment, the fragments are de-duplicated based on their respective hash values and access control identifiers associated with the fragments.

In an embodiment, fragments having a same first hash value and a first access control identifier are associated with a first object DSR, and wherein fragments having the same first hash value and a second access control identifier are associated with a second object DSR.

In an embodiment, the single object DSR supports a property associated with an object managed by the data platform system.

In an embodiment, the systems, methods, and non-transitory computer readable media are configured to determine a modification of a de-duplicated first fragment that has been imported into the data platform system as a first object DSR and applying one or more rules for managing one or more data source records associated with the de-duplicated fragment and the first object DSR in the data platform system.

In an embodiment, the systems, methods, and non-transitory computer readable media are configured to enforce a set of invariants that manage relationships between de-duplicated fragments and corresponding object DSRs and generate an error log entry when an invariant is breached.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Figure 1A:
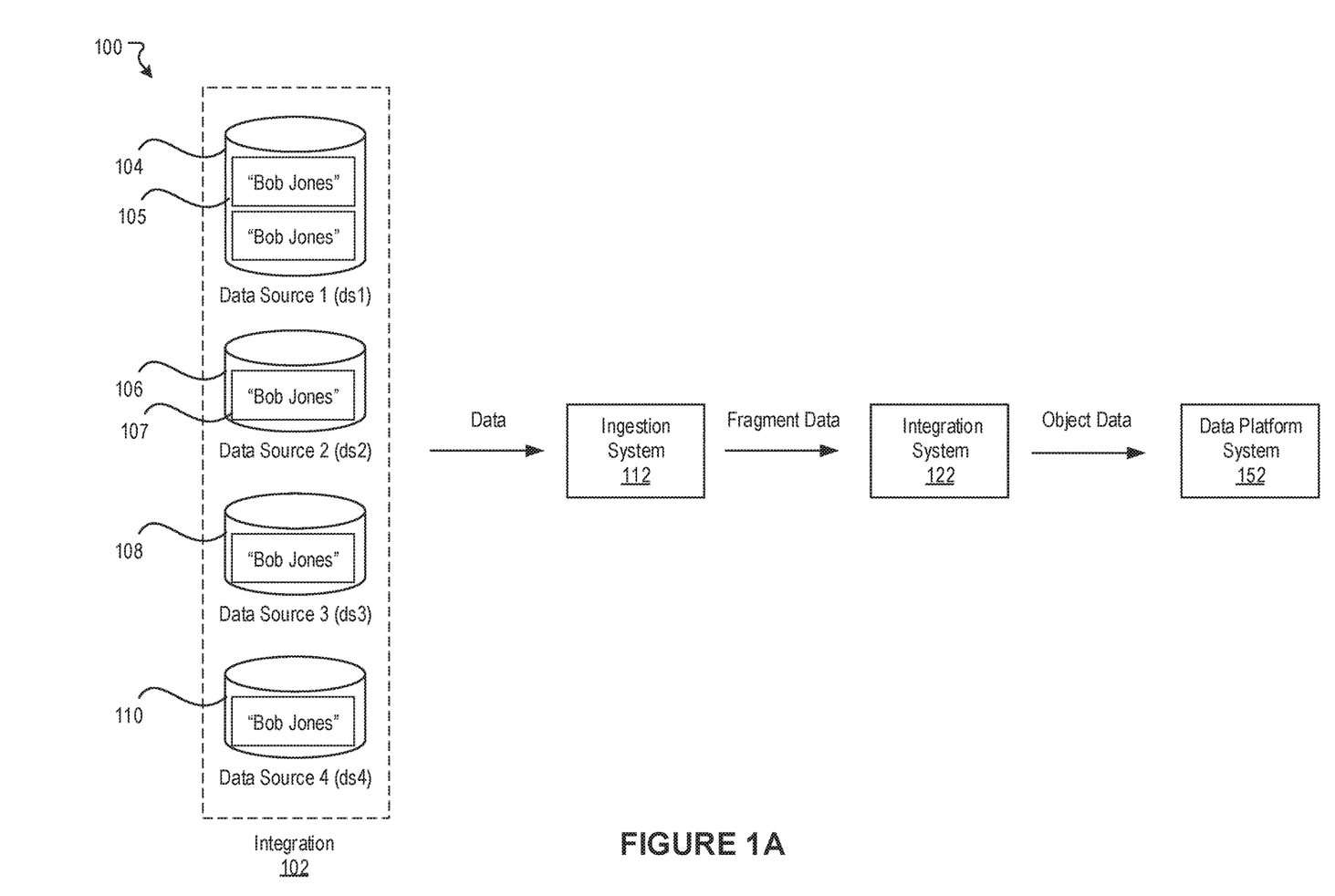
FIGS. 1A-1D illustrate example diagrams, in accordance with various embodiments.

A data integration pipeline can be used to ingest data stored in various disparate data sources and represent the ingested data based on some common format. For example, the data may be ingested from various data sources, such as databases, comma-separated text files, and spreadsheets, to name some examples. The ingested data can be represented based on a data ontology and be made accessible to users of a data platform system. For example, FIG. 1A illustrates an example environment 100 including integration data 102, an ingestion system 112, an integration system 122, and a data platform system 152. The integration data 102 can include data being integrated from various types of data sources, such as data stores, cloud-based storage, databases, files, and spreadsheets, to name some examples. In the example of FIG. 1A, the integration data 102 includes a first data source 104, a second data source 106, a third data source 108, and a fourth data source 110. The first data source 104 includes a first instance of data corresponding to a name of a person "Bob Jones" and a second instance of data corresponding to the name of the person "Bob Jones". For example, the first and second instances of data may be provided in different portions of a comma-separated values file. Similarly, the second data source 106 also includes another instance of data corresponding to the name of the person "Bob Jones". The third data source 108 also includes another instance of data corresponding to the name of the person "Bob Jones". Finally, the fourth data source 110 also includes another of data corresponding to the name of the person "Bob Jones".

The ingestion system 112 can ingest the instances of data corresponding to the name of the person "Bob Jones" for integration with the data platform system 152. For example, the ingestion system 112 can ingest each instance of data corresponding to "Bob Jones" as a fragment. Under conventional approaches, the ingestion system 112 can associate each fragment with one or more data source records. A data source record (DSR) for a given fragment can be associated with a DSR identifier, a data source identifier, and one or more access control identifiers. For example, the DSR identifier can identify the ingested instance of data based on a fragment identifier and an object property with which the fragment is associated. The data source identifier can identify a data source from which the fragment was ingested. Further, an access control list identifier can identify an access control list that governs user access to the fragment.

For example, an instance of data 105 can be ingested from the first data source 104 as a fragment "Bob Jones". The fragment can be associated with a DSR identifier which indicates the instance of data 105 corresponds to a "person" object and that the instance of data 105 "Bob Jones" is associated with a "name" property of the person object. Further, the instance of data 105 can be associated with an access control list identifier which identifies users or group of users that are permitted to access the instance of data 105. The instance of data 105 can also be associated with a data source identifier to indicate the instance of data 105 was ingested from the first data source 104. The ingestion system 112 can import the instance of data 105 based on this information. For example, when additional instances of data corresponding to the name of the person "Bob Jones" are ingested as fragments, the ingestion system 112 can similarly associate each fragment with a corresponding DSR identifier, an access control list identifier, and a data source record identifier. The ingestion system 112 can also determine a respective import key for each fragment. For example, when ingesting an instance of data 107 from the second data source 106, the ingestion system 112 can associate the instance of data 107 with a DSR identifier which indicates the instance of data 107 corresponds to the same "person" object and that the instance of data 107 "Bob Jones" is associated with the "name" property of the person object. Further, the instance of data 107 can be associated with an access control list identifier which identifies users or group of users that are permitted to access the instance of data 107. The instance of data 107 can also be associated with a data source record identifier to indicate the instance of data 107 was ingested from the second data source 106. The ingestion system 112 can generate an import key for the instance of data 107 which helps distinguish the instance of data 107 from other instance of data that also correspond to the name "Bob Jones" (e.g., the instance of data 105).

Figure 1B:
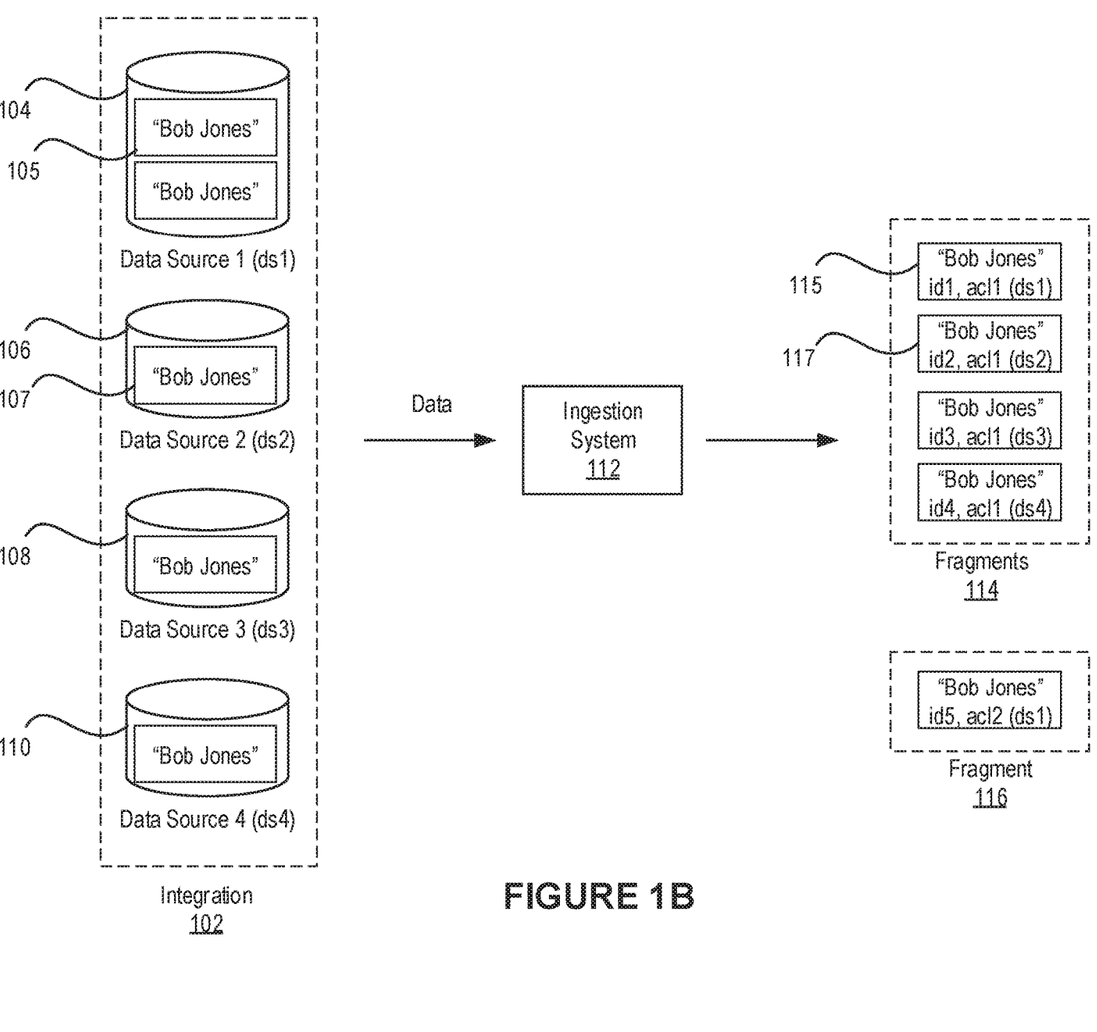

FIGURE 1B illustrates a first set of duplicate fragments 114 and a second fragment 116 of the ingested instances of data. For example, FIG. 1B illustrates a fragment 115 which corresponds to the instance of data 105 ingested from the first data source 104 and a fragment 117 which corresponds to the instance of data 107 ingested from the second data source 106. The fragments can be organized based on access control identifiers. For example, fragments corresponding to duplicate instances of data that are associated with a first access control list (ac11) can be organized into the first set of fragments 114 while fragments corresponding to duplicate instances of data that are associated with a second access control list (ac12) can be organized into a second set of fragments 116. In FIG. 1B, the first set of fragments 114 includes instances of data corresponding to "Bob Jones" which were ingested as part of the integration data 102 and are accessible to users associated with the first access control list (ac11). Similarly, the second set of fragments 116 includes an instance of data corresponding to "Bob Jones" which was ingested as part of the integration data 102 and is accessible to users associated with the second access control list (ac12).

Figure 1C:
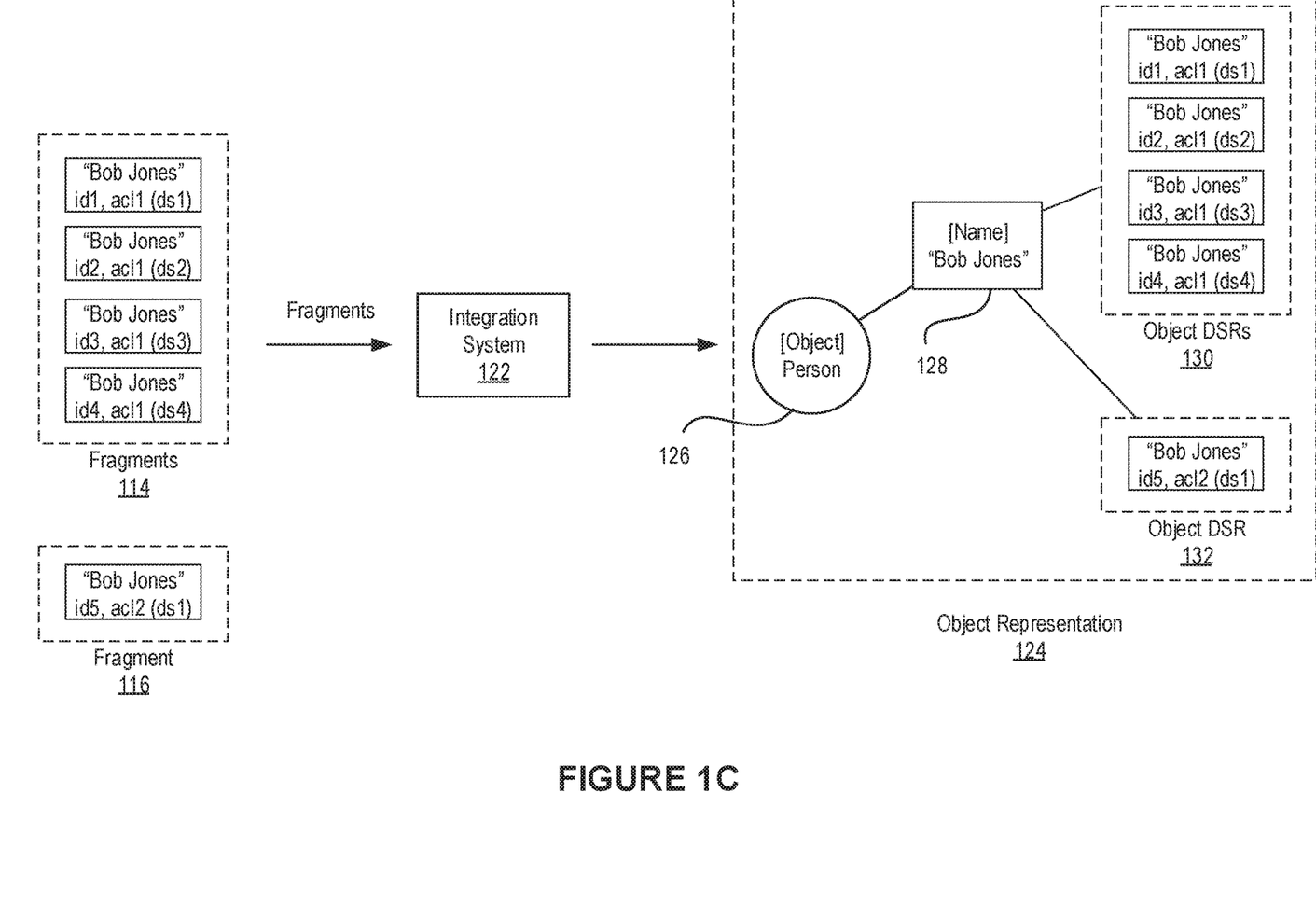

The integration system 122 can represent the fragments 114, 116 as object data based on a data ontology graph. Once represented as object data, the fragments 114, 116 can be accessed through the data platform system 152. In various embodiments, the data platform system 152 may store and manage various data as data objects in one or more data ontology graphs. A data ontology graph may be made up of a number of data objects that serve as containers for data. Each data object can include a number of object components including, for example, a properties component that includes structured pieces of information, a media component that includes binary attachments of data (e.g., text documents, images, videos, etc.), a notes component (e.g., a free text container), and one or more respective links (or edges) that associate the object with other objects in the object graph. In some instances, the data object graph can include different types of data objects. For example, a data object may represent an entity (e.g., person(s), place(s), thing(s), etc.), an activity (e.g., event, incident, etc.), a document, or multimedia. For example, FIG. 1C illustrates a conventional integration of the fragments 114, 116 as object representation 124. In FIG. 1C, a person object 126 is associated with a name property 128 "Bob Jones". In this example, the name property 128 is associated with a set of object data source records (DSRs) 130 that each reference a fragment in the first set of fragments 114. The name property 128 is also associated with an object DSR 132 which references a fragment in the second set of fragments 116. In the example of FIG. 1C, the name property 128 is shown associated with duplicate object DSRs 130 corresponding to fragments 114 which correspond to the same content, i.e., the name "Bob Jones". While the duplicate object DSRs 130 provide provenance information indicating different data sources from which the name "Bob Jones" was ingested, the duplicate object DSRs 130 are generally irrelevant to users of the data platform system 152. Instead, the duplicate object DSRs 130 can significantly impair user experience. For example, when a user attempts to interact with the object 126, the data platform system 152 can load details describing the object 126 including properties, such as the name property 128, and corresponding object DSRs 130, 132. As the number of duplicate object DSRs grows, so too does the amount of overhead needed to process the duplicate DSRs. As a result, such conventional approaches to integrating data can be computationally expensive. This additional burden on the data platform system 152 can result in significantly slower processing times which can ultimately degrade user experience.

Figure 1D:
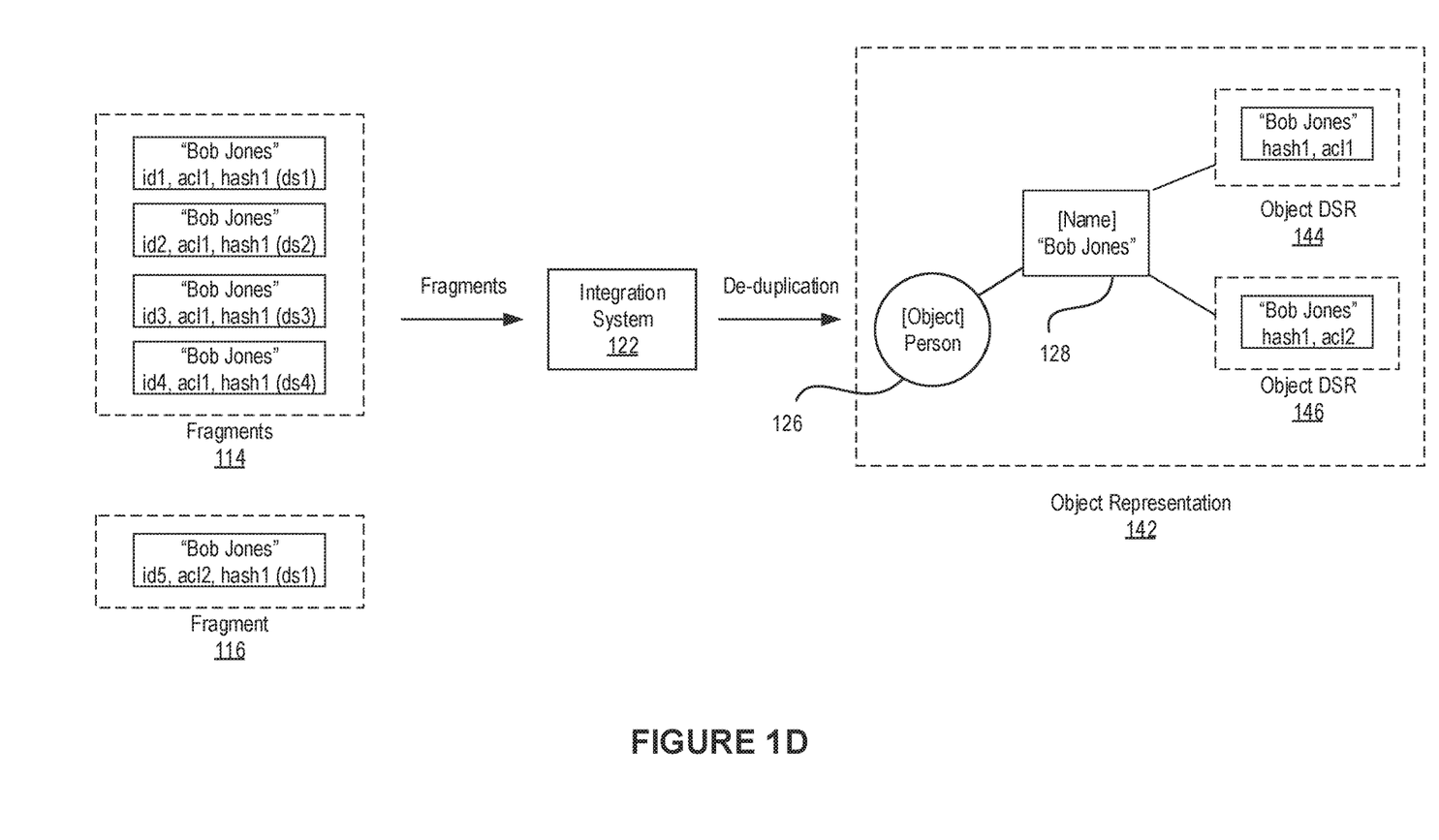

A claimed solution rooted in computer technology overcomes problems specifically arising in the realm of computer technology. In various embodiments, the integration system 122 can be configured to de-duplicate fragments that correspond to identical content. For example, the integration system 122 can de-duplicate the fragments 114 which are all associated with the first access control list and correspond to the same content "Bob Jones". After de-duplication, the integration system 122 can represent the de-duplicated fragments 114 as object representation 142 based on the data ontology graph, as illustrated in the example of FIG. 1D. For example, rather than including all of the duplicate fragments 114, FIG. 1D shows a single object DSR 144 that corresponds to the name "Bob Jones" and the first access control list. In some embodiments, the integration system 122 can de-duplicate fragments based on duplicate content referenced by the fragments. For example, a given fragment can be associated with a hash value of content included in the fragment (e.g., the name "Bob Jones"). In this example, the integration system 122 can de-duplicate fragments based on the hash value. FIG. 1D also shows an object DSR 146 that corresponds to the name "Bob Jones" and the second access control list. More details describing the disclosed technology are provided below.

Figure 2:
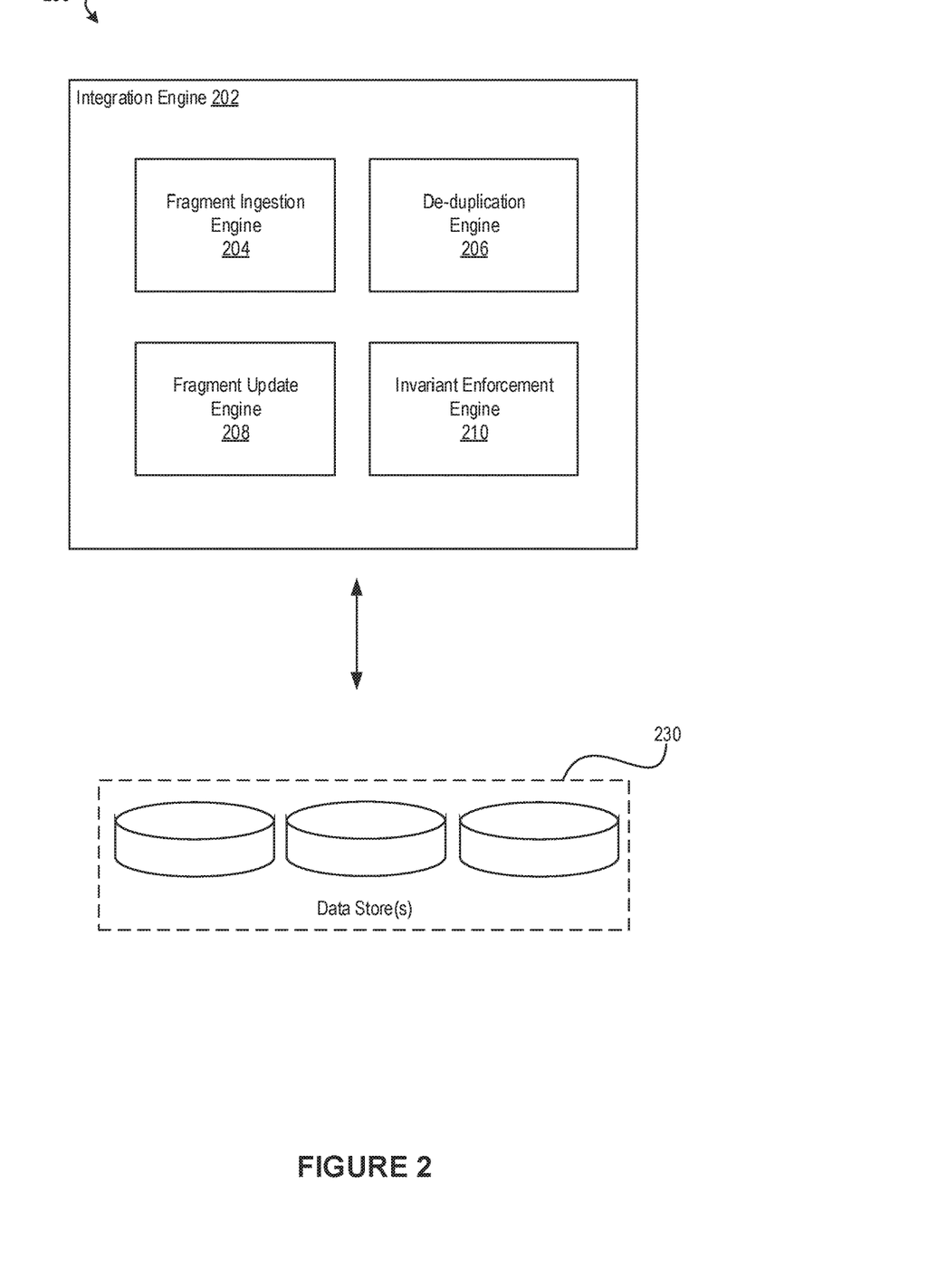
FIG. 2 illustrates an example computing environment, in accordance with various embodiments.

FIG. 2 illustrates an example environment 200, in accordance with various embodiments. The example environment 200 can include at least an integration engine 202. For example, the integration engine 202 can be implemented in the integration system 122 of FIG. 1A. The integration system 122 can include one or more processors and memory. The processors can be configured to perform various operations by interpreting machine-readable instructions. The integration engine 202 can access one or more data stores 230. In general, a data store may be any device in which data can be stored and from which data can be retrieved. The integration engine 202 and the data stores 230 may be accessible either directly or over a network. The network may be any wired or wireless network through which data can be sent and received (e.g., the Internet, local area network, etc.). In various embodiments, the integration engine 202 can include a fragment ingestion engine 204, a de-duplication engine 206, a fragment update engine 208, and an invariant enforcement engine 210. The integration engine 202 and its sub-engines can be executed by the processor(s) of the integration system 122 to perform various operations. In general, the integration engine 202 and its sub-engines can be implemented, in whole or in part, as software that is capable of running on one or more computing devices or systems. In one example, the integration engine 202 and its sub-engines may be implemented as or within a software application running on one or more computing devices (e.g., user or client devices) and/or one or more servers (e.g., cloud servers). Many variations are possible.

The fragment ingestion engine 204 can be configured to ingest fragments that correspond to instances of data integrated from various data sources. In various embodiments, the fragment ingestion engine 204 can associate each ingested fragment with a data source record (DSR) identifier, one or more access control identifiers, and a data store identifier. The DSR identifier can include a unique fragment identifier for the fragment. For example, a DSR identifier for a fragment can identify a related object, object property (e.g., name(s), address, phone number, etc.), and its fragment identifier. For example, a first fragment can be associated with a DSR identifier that identifies a person object "Person1", a name property of the object "Jane Doe", and a fragment identifier firstFrag. A second fragment can be associated with a DSR identifier that identifies the person object "Person2", a name property of the object "Jane Doe", and a fragment identifier secondFrag. In various embodiments, the fragment ingestion engine 204 also generates and assigns respective hash values to ingested fragments. For example, a hash value of a fragment can be determined based on an instance of data (e.g., content) associated with the fragment using generally known techniques. In some embodiments, the hash value can be determined based on MurmurHash, a non-cryptographic hash function. For example, a hash value for a first fragment associated with an instance of data corresponding to a name "Jane Doe" can be determined by hashing the data "Jane Doe". If a second fragment is associated with a different instance of the name "Jane Doe", a hash value determined for this second fragment will still be the same as the hash value determined for the first fragment, since the hash values are computed from the same data, i.e., "Jane Doe". In various embodiments, hash values generated for fragments can be used to de-duplicate fragments that correspond to duplicate data, as described below.

The de-duplication engine 206 can be configured to de-duplicate fragments ingested by the fragment ingestion engine 204. In various embodiments, the de-duplication engine 206 can de-duplicate fragments based at least on respective hash values generated for the fragments. As mentioned above, hash values for fragments that correspond to duplicate data will be identical. For example, a hash value for a first fragment associated with an instance of data corresponding to a name "Jane Doe" will be identical to a hash value for a second fragment associated with another instance of the name "Jane Doe". In the foregoing example, the de-duplication engine 206 can de-duplicate the first fragment and the second fragment based on the fragments having the same hash value. In some embodiments, the de-duplication engine 206 can de-duplicate fragments based on their hash values and other associated information. For example, if the first fragment is associated with a first access control identifier and the second fragment is associated with a second access control identifier, then no de-duplication occurs since the first fragment "Jane Doe" is associated with a different access control identifier than the second fragment "Jane Doe". In contrast, if both the first and second fragments are associated with only a first access control identifier, then the fragments can be de-duplicated since they both correspond to the same name "Jane Doe" and are associated with only the first access control identifier. In various embodiments, the de-duplication engine 206 can represent the de-duplicated fragments as a single object data source record (DSR) within the data platform system 152 that is associated with the hash value and one or more access control identifiers shared amongst the de-duplicated fragments. In various embodiments, users and administrators can inspect the provenance of de-duplicated fragments to determine an original data source from which a given fragment was ingested.

The fragment update engine 208 can be configured to apply various rules when implementing changes to fragments that have been de-duplicated and represented in object form within the data platform system 152. For example, in some embodiments, when a fragment associated with a given DSR identifier is deleted in the integration system 122, the fragment update engine 208 determines whether any corresponding fragment DSRs are known to the integration system 122. For example, if the deleted fragment corresponds to the name "Jane Doe", the fragment update engine 208 determines whether any other fragment DSRs are associated with the deleted fragment. If no other corresponding fragment DSRs exist, the fragment update engine 208 requests deletion of a corresponding object DSR associated with the deleted fragment in the data platform system 152. If other corresponding fragment DSRs exist, then the fragment update engine 208 takes no action.

In some embodiments, when access control information (e.g., one or more access control identifiers) associated with a fragment with a given DSR is modified in the integration system 122, the fragment update engine 208 determines whether any corresponding fragment DSRs are known to the integration system 122. For example, if the modified fragment corresponds to the name "Jane Doe" and is associated with a first access control identifier, the fragment update engine 208 determines whether any other fragment DSRs corresponding to the name "Jane Doe" and associated with the first access control identifier exist. If other corresponding fragments exist, then the fragment update engine 208 requests creation of a new corresponding object DSR in the data platform system 152 based on the modified access control information. If no other corresponding fragments exist, the fragment update engine 208 requests similar modification of access control information associated with a corresponding object DSR in the data platform system 152.

In some embodiments, when access control information associated with a fragment and a given DSR is modified and then the fragment is deleted in the integration system 122, the fragment update engine 208 determines whether any corresponding fragment DSRs are known to the integration system 122. If other corresponding fragment DSRs exist, then the fragment update engine 208 takes no action.

If no other corresponding fragment DSRs exist, the fragment update engine 208 determines whether access control information associated with other fragment DSRs is simultaneously being modified and then being deleted. If such other fragments exist, the fragment update engine 208 requests modification of access control information associated with a corresponding object DSR in the data platform system 152 to match one of the new access control identifiers (deterministically chosen) and requests deletion of the object DSR. If no such fragments exist, the fragment update engine 208 requests modification of access control information associated with a corresponding object DSR in the data platform system 152 to match the new access control identifier and requests deletion of the object DSR.

The invariant enforcement engine 210 can be configured to enforce a set of invariants. For example, in some embodiments, the invariant enforcement engine 210 ensures there exists at least one object DSR in the data platform system 152 which corresponds to each fragment DSR in the integration system 122. In some embodiments, the invariant enforcement engine 210 ensures there do not exist any object DSRs in the data platform system 152 which do not correspond to at least one fragment DSR in the integration system 122. In some embodiments, the invariant enforcement engine 210 ensures object history in the data platform system 152 does not reveal information about object components (e.g., object properties) using their previously associated access control identifiers. For example, a component whose access control information was modified prior to deletion should not appear under an access control identifier that was previously associated with the component. In various embodiments, the invariant enforcement engine 210 can generate one or more notifications or errors when a given invariant is breached. In some embodiments, the invariant enforcement engine 210 can generate an error log describing breached invariants and related information.

Figure 3:
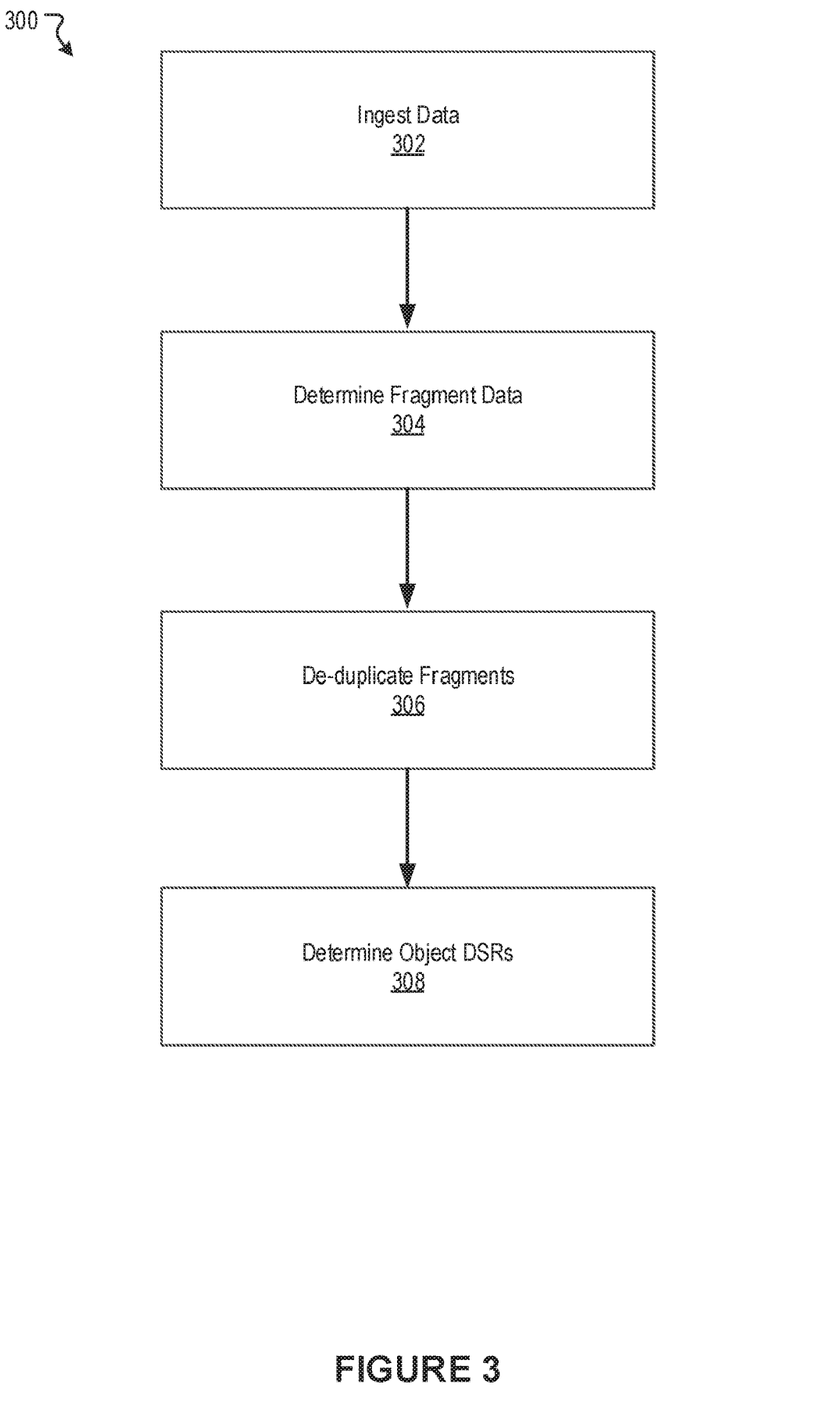
FIG. 3 illustrates a flowchart of an example method, in accordance with various embodiments.

FIG. 3 illustrates a flowchart of an example method 300, according to various embodiments of the present disclosure. The method 300 may be implemented in various environments including, for example, the environment 200 of FIG. 2. The operations of method 300 presented below are intended to be illustrative. Depending on the implementation, the example method 300 may include additional, fewer, or alternative steps performed in various orders or in parallel. The example method 300 may be implemented in various computing systems or devices including one or more processors.

At block 302, data can be ingested from various external data sources. For example, the data may be ingested as part of an integration, such as the integration data 102 of FIG. 1A. At block 304, fragment data can be determined based on the ingested data. For example, fragments corresponding to ingested instances of data can be created along with one or more corresponding data source records and hash values of fragment content, as described above. At block 306, the fragments can be de-duplicated. For example, the fragments can be de-duplicated based on their hash values and other associated information (e.g., access control identifiers, data source identifiers, etc.). At block 308, corresponding object data source records (DSRs) can be determined from the de-duplicated fragments, as described above.

Figure 4:
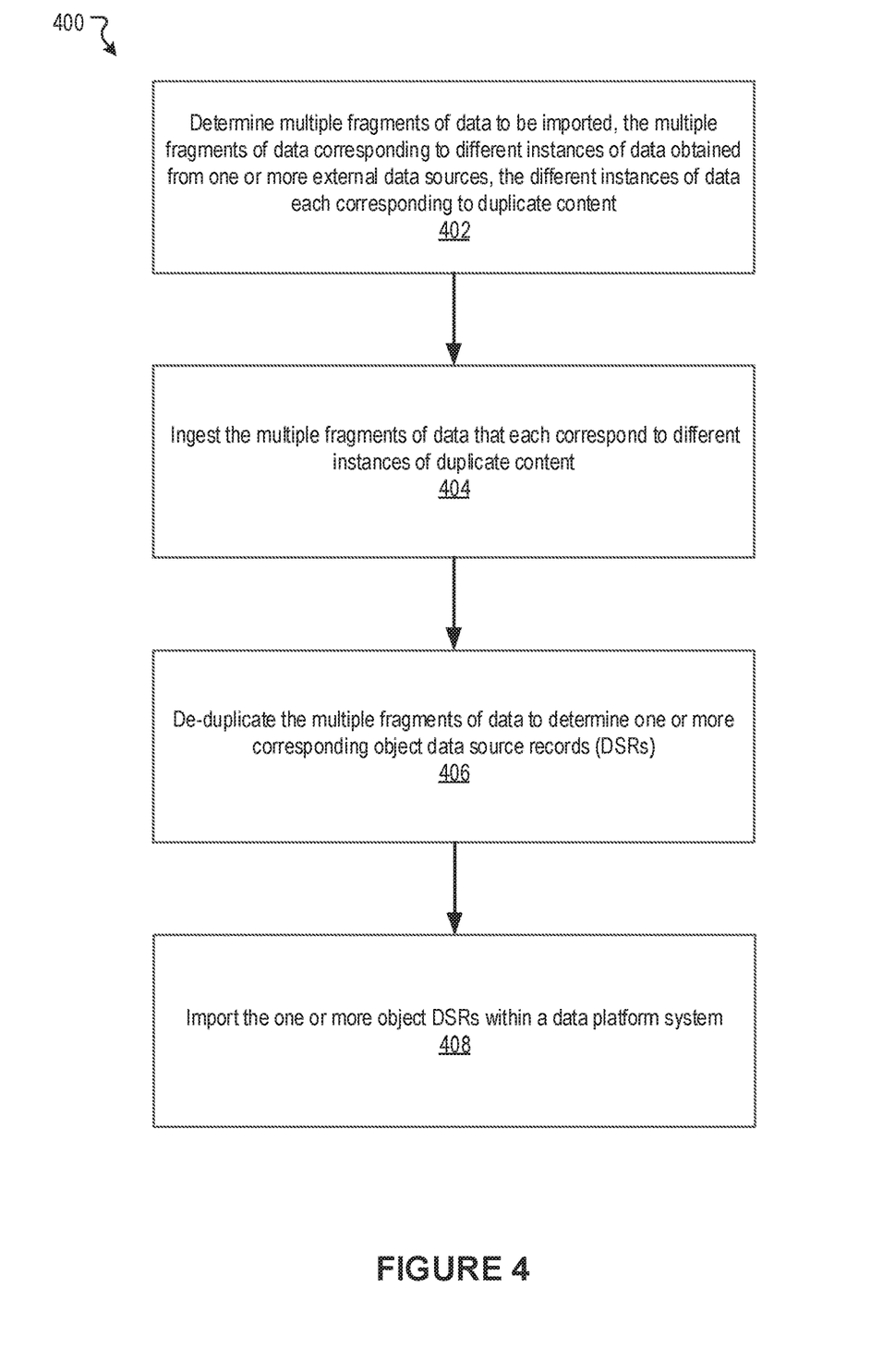
FIG. 4 illustrates a flowchart of another example method, in accordance with various embodiments.

FIG. 4 illustrates a flowchart of an example method 400, according to various embodiments of the present disclosure. The method 400 may be implemented in various environments including, for example, the environment 200 of FIG. 2. The operations of method 400 presented below are intended to be illustrative. Depending on the implementation, the example method 400 may include additional, fewer, or alternative steps performed in various orders or in parallel. The example method 400 may be implemented in various computing systems or devices including one or more processors.

At block 402, multiple fragments of data to be imported are determined (or accessed), the multiple fragments of data corresponding to different instances of data obtained from one or more external data sources, the different instances of data each corresponding to duplicate content. At block 404, the multiple fragments of data that each correspond to different instances of duplicate content can be ingested. At block 406, the multiple fragments of data can be de-duplicated to determine one or more corresponding object data source records (DSRs). At block 408, the one or more object DSRs can be imported within a data platform system.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
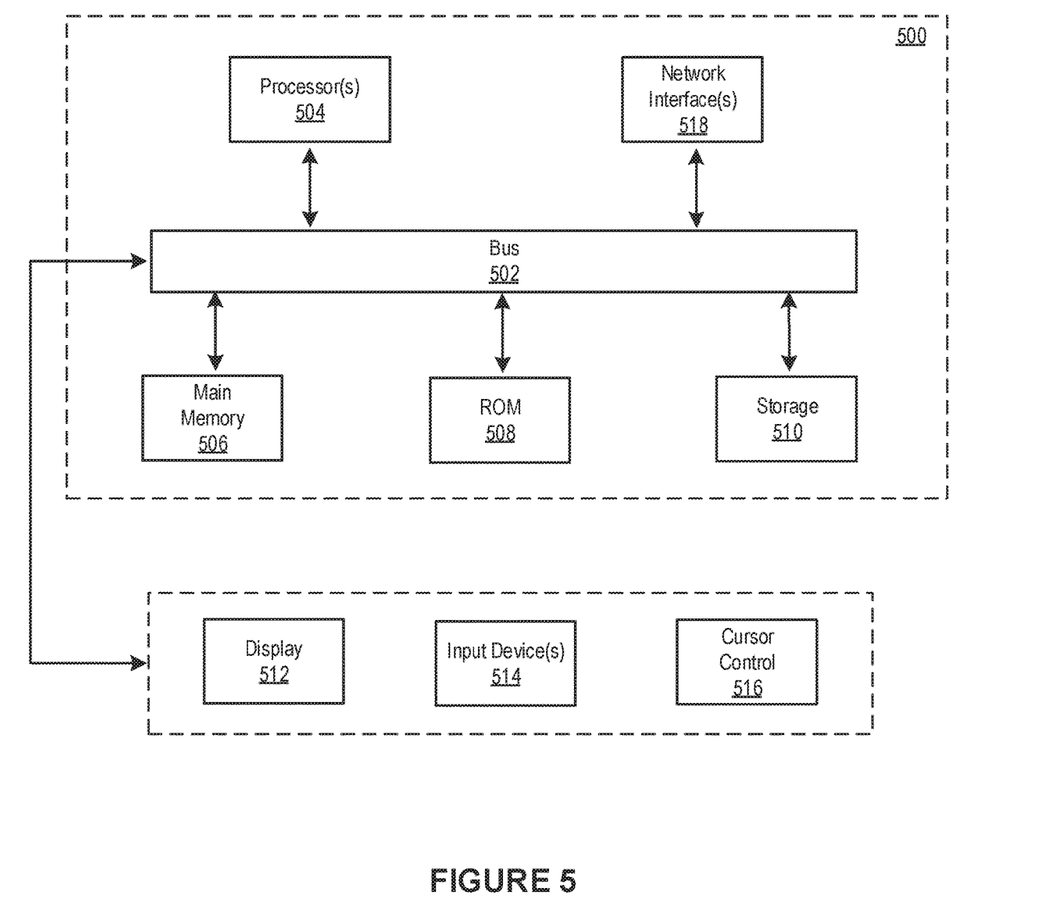
FIG. 5 illustrates a block diagram of an example computer system in which any of the embodiments described herein may be implemented.

FIG. 5 is a block diagram that illustrates a computer system 500 upon which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module (or engine) to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules (or engines) may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a stand-alone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A system comprising:
one or more processors; and
a memory storing instructions that, when executed by the one or more processors, cause the system to perform:
determining multiple fragments of data to be imported, the multiple fragments of data corresponding to different instances of data obtained from one or more external data sources, the different instances of data each corresponding to duplicate content, wherein at least a portion of the multiple fragments have different formats;
ingesting the multiple fragments of data that each correspond to different instances of duplicate content;
de-duplicating the multiple fragments of data to determine one or more corresponding object data source records (DSRs);
importing the one or more object DSRs within a data platform system;
determining that access control information associated with a first fragment of the multiple fragments of data has been modified into modified access control information, wherein the first fragment is associated with a particular object DSR;
determining whether a second fragment is associated with the access control information and the particular object DSR; and
selectively creating a new object DSR within the data platform system based on the modified access control information and based on the determination of whether the second fragment is associated with the access control information and the particular object DSR.

2. The system of claim 1, wherein each ingested fragment is associated with a corresponding hash value, and wherein the hash value is determined based on content associated with the ingested fragment.

3. The system of claim 1, wherein de-duplicating the multiple fragments of data further causes the system to perform:
de-duplicating the multiple fragments of data based on their respective hash values.

4. The system of claim 3, wherein fragments having a same first hash value are associated with a first object DSR, and wherein fragments having a same second hash value are associated with a second object DSR.

5. The system of claim 1, wherein de-duplicating the multiple fragments of data further causes the system to perform:

de-duplicating the multiple fragments of data based on their respective hash values and other information associated with the fragments.

6. The system of claim 5, wherein the fragments are de-duplicated based on their respective hash values and access control identifiers associated with the fragments.

7. The system of claim 6, wherein fragments having a same first hash value and a first access control identifier are associated with a first object DSR, and wherein fragments having the same first hash value and a second access control identifier are associated with a second object DSR.

8. The system of claim 1, wherein the single object DSR supports a property associated with an object managed by the data platform system.

9. The system of claim 1, further comprising:
determining a modification of a de-duplicated first fragment that has been imported into the data platform system as a first object DSR; and
applying one or more rules for managing one or more data source records associated with the de-duplicated fragment and the first object DSR in the data platform system.

10. The system of claim 1, further comprising:
enforcing a set of invariants that manage relationships between de-duplicated fragments and corresponding object DSRs; and
generating an error log entry when an invariant is breached.

11. A computer-implemented method, comprising:
determining, by a computing system, multiple fragments of data to be imported, the multiple fragments of data corresponding to different instances of data obtained from one or more external data sources, the different instances of data each corresponding to duplicate content, wherein at least a portion of the multiple fragments have different formats;
ingesting, by the computing system, the multiple fragments of data that each correspond to different instances of duplicate content;
de-duplicating, by the computing system, the multiple fragments of data to determine one or more corresponding object data source records (DSRs);
importing, by the computing system, the one or more object DSRs within a data platform system;
determining, by the computing system, that access control information associated with a first fragment of the multiple fragments of data has been modified into modified access control information, wherein the first fragment is associated with a particular object DSR;
determining, by the computing system, whether a second fragment is associated with the access control information and the particular object DSR: and
selectively creating, by the computing system, a new object DSR within the data platform system based on the modified access control information and based on the determination of whether the second fragment is associated with the access control information and the particular object DSR.

12. The computer-implemented method of claim 11, wherein each ingested fragment is associated with a corresponding hash value, and wherein the hash value is determined based on content associated with the ingested fragment.

13. The computer-implemented method of claim 11, wherein de-duplicating the multiple fragments of data further comprises:
de-duplicating, by the computing system, the multiple fragments of data based on their respective hash values.

14. The computer-implemented method of claim 11, wherein fragments having a same first hash value are associated with a first object DSR, and wherein fragments having a same second hash value are associated with a second object DSR.

15. The computer-implemented method of claim 11, wherein de-duplicating the multiple fragments of data further comprises:
de-duplicating, by the computing system, the multiple fragments of data based on their respective hash values and other information associated with the fragments.

16. A non-transitory computer readable medium comprising instructions that, when executed, cause one or more processors of a computing system to perform:
determining multiple fragments of data to be imported, the multiple fragments of data corresponding to different instances of data obtained from one or more external data sources, the different instances of data each corresponding to duplicate content, wherein at least a portion of the multiple fragments have different formats;
ingesting the multiple fragments of data that each correspond to different instances of duplicate content;
de-duplicating the multiple fragments of data to determine one or more corresponding object data source records (DSRs);
importing the one or more object DSRs within a data platform system;
determining that access control information associated with a first fragment of the multiple fragments of data has been modified into modified access control information, wherein the first fragment is associated with a particular object DSR:
determining whether a second fragment is associated with the access control information and the particular object DSR; and
selectively creating a new object DSR within the data platform system based on the modified access control information and based on the determination of whether the second fragment is associated with the access control information and the particular object DSR.

17. The non-transitory computer readable medium of claim 16, wherein each ingested fragment is associated with a corresponding hash value, and wherein the hash value is determined based on content associated with the ingested fragment.

18. The non-transitory computer readable medium of claim 16, wherein de-duplicating the multiple fragments of data further causes the computing system to perform:
de-duplicating the multiple fragments of data based on their respective hash values.

19. The non-transitory computer readable medium of claim 18, wherein fragments having a same first hash value are associated with a first object DSR, and wherein fragments having a same second hash value are associated with a second object DSR.

20. The non-transitory computer readable medium of claim 16, wherein de-duplicating the multiple fragments of data further causes the computing system to perform:
de-duplicating the multiple fragments of data based on their respective hash values and other information associated with the fragments.

* * * * *